United States Patent
Kamimura et al.

(10) Patent No.: US 7,144,303 B2
(45) Date of Patent: Dec. 5, 2006

(54) METHOD OF POLISHING A LARGE PART AND ABRASIVE FOR USE IN THE METHOD

(75) Inventors: Kenji Kamimura, Yokohama (JP); Satoru Asai, Yokohama (JP); Satoru Yanaka, Yokosuka (JP); Ryusuke Tsuboi, Yokohama (JP); Tadashi Tanuma, Yokohama (JP); Masataka Kikuchi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/312,341

(22) Filed: Dec. 21, 2005

(65) Prior Publication Data

US 2006/0111023 A1 May 25, 2006

Related U.S. Application Data

(63) Continuation of application No. PCT/JP2004/006174, filed on Apr. 28, 2004.

(51) Int. Cl.
 *B24B 1/00* (2006.01)
(52) U.S. Cl. ............................. 451/38; 451/40; 451/55
(58) Field of Classification Search ............ 451/36–40, 451/28, 55, 90, 95–97, 75
 See application file for complete search history.

(56) References Cited

U.S. PATENT DOCUMENTS

| 6,146,247 A | * | 11/2000 | Nokubi et al. ................. 451/40 |
| 6,568,994 B1 | | 5/2003 | Shaw |
| 2003/0027495 A1 | | 2/2003 | Shaw |

FOREIGN PATENT DOCUMENTS

| JP | 9-314468 | 12/1997 |
| JP | 2957492 | 7/1999 |
| JP | 2000-61846 | 2/2000 |
| JP | 2004-91722 | 3/2004 |

* cited by examiner

*Primary Examiner*—Dung Van Nguyen
(74) *Attorney, Agent, or Firm*—Oblon, Spivak, McClelland, Maier & Neustadt, P.C.

(57) ABSTRACT

A surface to be polished of a large part is polished by projecting and colliding an abrasive comprising abrasive grains and an elastic petrochemical high polymer material having the specific gravity of 0.5 to 1.8 $g/cm^3$ and elasticity of 10 to 200 $ckg/cm^2$ or an elastic natural material, to the surface to be polished of the large part at a speed of 600 m to 3800 m per minute and by a volume of 5 to 300 $cc/cm^2 \cdot sec$ per unit area, and sliding the abrasive.

7 Claims, 3 Drawing Sheets

METHOD OF POLISHING A LARGE PART AND ABRASIVE FOR USE IN THE METHOD

CROSS-REFERENCE TO RELATED APPLICATIONS

This is a Continuation Application of PCT Application No. PCT/JP2004/006174, filed Apr. 28, 2004, which was published under PCT Article 21(2) in Japanese.

BACKGROUND OF THE INVENTION

1. Field of the Invention

The present invention relates to a method of polishing a large part by projecting and colliding abrasives to a surface of the large part, and an abrasive for use in the method.

2. Description of the Related Art

In large parts such as a steam turbine, moving and stationary vanes, a turbine rotor, or parts of fluid passage (a steam valve, steam tube, crossover tube, turbine inlet, outlet, or nozzle box inside) of the steam turbine, the surface roughness of the large parts has a key factor on the turbine performance, and it is required to improve the surface state by polishing.

As a representative example of the large parts, a schematic configuration of a general steam turbine will be explained by referring to FIGS. 6 and 7.

FIG. 7 is a schematic sectional view showing an entire steam turbine. A turbine rotor 1 has about a hundred moving vanes set in the peripheral direction to form vane rows, and the vane rows are disposed at mutual intervals in different lengths of moving vanes 1a in the axial direction, depending on the pressure and temperature of steam passing therethrough.

A turbine casing 2 comprises nozzle diaphragms 3 shown in FIG. 6 disposed between the vane rows. The nozzle diaphragm 3 is formed of a nozzle diaphragm inner ring 4 and a nozzle diaphragm outer ring 5, and a stationary vane 6 is held between the rings.

By installing the turbine casing 2, stationary vanes 6 of the nozzle diaphragm 3 are disposed between the vane rows in the axial direction of the turbine rotor 1.

As a result, in the axial direction of the turbine rotor 1, the moving vanes 1a and stationary vanes 6 are disposed alternately, and a turbine stage is formed by the combination of a set of the moving vane and stationary vane.

By arranging such turbine stages in several stages, a high pressure turbine 7, a medium pressure turbine 8, and a low pressure turbine 9 are formed.

Steam flow of the steam turbine will be explained below.

In FIG. 7, steam of high temperature and high pressure introduced from a boiler (not shown) is first sent into the high pressure turbine, and heat energy is transformed into mechanical rotary energy by each turbine stage, so that the high pressure turbine 7 is put into rotation.

The steam having worked in the high pressure turbine 7 is sent into a reheater in the boiler again, regenerated into steam of high temperature and high pressure again, and sent into the medium pressure turbine.

The steam having worked and rotated the medium pressure turbine 8 is directly exhausted into a crossover tube 10, and flows in the inside of the crossover tube 10 and enters the low pressure turbine 9.

The steam having entered the low pressure turbine 9 similarly works by rotating the low pressure turbine 9, and is then exhausted into a condenser 11, at which the steam is condensed into water. The condensed water is sent back into the boiler to be steam, and is introduced into the turbine. In this manner, the circulation is repeated.

In the steam turbine having such a configuration, in order to enhance the performance, it is required to polish the surface of turbine parts so as to eliminate the roughness, thereby lowering the passage resistance when the steam flows.

FIG. 8 shows the turbine stage efficiency when the surface roughness is improved, supposing the efficiency in the turbine stage at surface roughness of Ry 6.3 in the current design specification to be 100.

As known from the diagram, by finishing more smoothly in the steam passing parts in the turbine stage composed of moving vanes and stationary vanes, the efficiency is improved by about 3.5% from the current level.

At the present, technical developments are attempted by various methods for improvement of efficiency of a steam turbine, and further for improvement of power generation efficiency, and such a method not requiring major design change or modification of equipment is widely noticed, and has been already applied in actual machines.

However, for example, since one moving vane is longer than 1 meter and the shape is extremely complicated, narrow and complicated parts must be polished, and it is hard to polish mechanically or automatically.

In the conventional work of polishing turbine parts, compressed air or a power rotary tool such as a so-called grinder has been used, or liquid, paper, cloth, chemical fiber or the like having polishing effect has been used in manual polishing work known as buffing.

Such a method of polishing turbine parts requires much time and cost.

Recent methods of polishing a material to be polished include a sand blasting method of polishing the surface of parts to be polished by projecting ceramic projection materials by the compressed air.

In the sand blasting method, the surface can be cleaned, the film can be removed in the entire region of projection range, and the polishing performance is excellent. However, the surface thickness may be reduced excessively, and the surface roughness may be worsened, so that there are environmental problems such as scattering of dust particles. In turbine parts, in particular, it is hard to obtain the surface roughness of Ry 6.3 or Ra 1.0 or less in the finished state.

On the other hand, the steam turbine is inspected periodically, and parts through which high temperature steam passes, such as the moving vanes 1a and stationary vanes 6 in the inside, are inspected.

The steam contains traces of impurities called oxide scales, and the oxide scales are collected on the moving vanes 1a and stationary vanes 6 during operation for a long period of time. Therefore, oxide films often deposit on the surface.

Such oxide scales and oxide films are known to lower the precision of nondestructive inspection extremely at the time of periodic inspection. In nondestructive inspection, liquid penetrates from the surface into the inner parts, or X-ray or ultrasonic wave is emitted to inspect the inside state by reflected waves from the inside. Therefore, when the roughness of the surface as the access of information from inside is poor, the information from the inside is disturbed, and the precision of inspection is lowered.

Accordingly, at the time of periodic inspection, such oxide scales and oxide films are necessarily removed, and the surface roughness is minimized by manual work. It hence takes much time and labor, and because of manual work, the surface roughness degree varies, and the precision of inspection is not always excellent.

Besides, the oxide scales and others depositing on the moving vanes 1a and stationary vanes 6 cause to change the vane sectional shape at the time of designing, so that the performance of the steam turbine itself may be also lowered. Accordingly, at the time of periodic inspection, such oxide scales or the like are scraped off. Since the rear edges of the vanes are very thin in particular, deformation may be increased in the sand blasting method.

In a known method of grinding a work surface, abrasive grains having grinding powder adhered to a carrier made of elastic and porous vegetable fibers by using fat or sugar contained in vegetable fibers as an adhesive are injected in multiplicity obliquely from the work surface by mixing with a grinding fluid, and the abrasive grains slide on the work surface while elastically deforming the carrier, so that the work surface is finished by the grinding powder (Jpn. Patent No. 2957492, for example).

BRIEF SUMMARY OF THE INVENTION

The grinding method is suited to polishing of small pieces such as dental prosthesis, but in the case of the large parts such as turbine parts, it is hard to polish the surface of very complicated and narrow parts due to characteristics of the flowing steam.

It is hence an object of the invention to provide a method of polishing the large parts capable of polishing the surface including narrow parts or fitting parts of turbine parts which are conventionally hard to polish, removing surface oxide films without impairing the surface polishing, and enhancing the quality of nondestructive inspection, and an abrasive for use in the method.

In a first invention, a granular abrasive of 0.1 mm or more and 10.0 mm or less having abrasive grains as abrasive materials adhered to the surrounding of a projection material or dispersed in the projection material is sprayed on a surface to be polished at a speed of 600 m or more and 3,800 m or less per minute by a unit area volume of 5 to 300 $cm^3/cm^2 \cdot sec$, and the abrasive slides on the surface to be polished for a very short period of time, whereby the abrasive grains adhered to or dispersed in the abrasive polish the surface to be polished.

In a second invention, in the method of polishing a large part according to the first invention, the projection material is a petrochemical high polymer material formed of synthetic fiber, synthetic resin, or synthetic rubber having the specific gravity of 0.5 to $1.8 \times 10^{-3}$ $kg/cm^3$, and elasticity of 10 to 200 $kg/cm^2$, or a natural material formed of natural rubber, vegetable fiber, or vegetable seeds.

In a third invention, in the method of polishing the large part according to the first or second invention, the abrasive is sprayed from a direction of 30° to 80° to the normal direction of the surface to be polished.

In a fourth invention, in the method of polishing the large part according to the first invention, the abrasive grains are any one of SiC, $SiO_2$, $Al_2O_3$, and $ZrO_2$.

In a fifth invention, in the method of polishing the large part according to the first or second invention, the projection material and abrasive grains are composed of at least components other than chlorine, sulfuric acid, silica, boron, iron, copper, nickel, chromium and cobalt.

In a sixth invention, the abrasive for use in the method of polishing the large part according to the second invention are formed by any one of a methods of adhering abrasive grains as abrasive materials to the surrounding of a projection material as a core by the adhesiveness of the projection material, a method of applying an elastic adhesive to the surrounding of the projection material and adhering the abrasive grains as abrasive materials by way of the adhesive, and a method of dispersing the abrasive grains as abrasive materials in the projection material.

In a seventh invention, in the abrasive for use in the method of polishing the large part, according to the sixth invention, the abrasive grains are any one of SiC, $SiO_2$, $Al_2O_3$, and $ZrO_2$.

In an eighth invention, in the abrasive for use in the method of polishing the large part, according to the sixth invention, the projection material and abrasive grains are composed of at least components other than chlorine, sulfuric acid, silica, boron, iron, copper, nickel, chromium and cobalt.

The invention enables to polish the surface including a narrow part or a fitting part of the large part which is conventionally difficult to polish, and enables to remove oxide films grown on the surface without worsening the polished surface, and hence enhances the quality of nondestructive inspection.

DETAILED DESCRIPTION OF THE INVENTION

Figure 1:
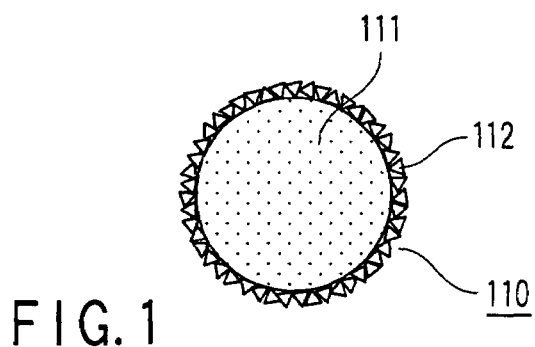
FIG. 1 is a sectional view showing a schematic structure of abrasives for explaining first and second embodiments of a method of polishing a large part according to the invention.

FIG. 1 is a sectional structural view of abrasives used in the invention.

An abrasive 110 has a projection material 111 as a core in its center, and abrasive grains 112 serving as polishing materials are adhered to the surrounding.

Figure 2:
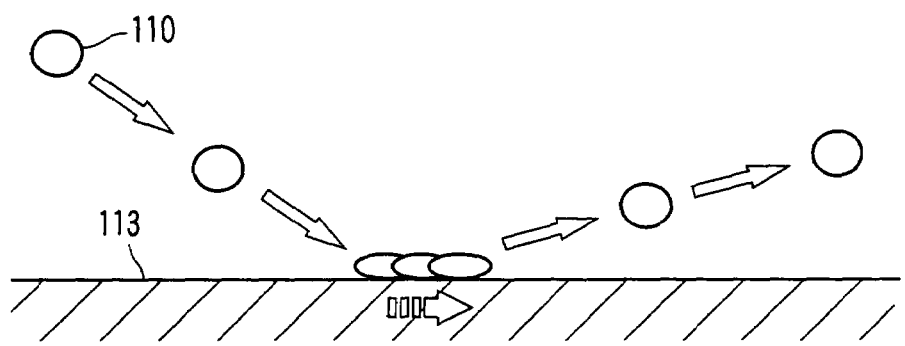
FIG. 2 is a schematic view explaining the principle of creating polishing effect by colliding abrasives against a surface to be polished.

FIG. 2 is a schematic view explaining the features of this polishing method.

The abrasive 110 is sprayed to a surface to be polished 113 at a certain angle, and collides against the surface to be polished 113, and the abrasive 110 slides for a very short time on the surface while deforming elastically. It is flown away at a certain angle from the surface to be polished 113.

When sliding on the surface to be polished 113, the abrasive grains 112 adhered to the surface of the abrasive 110 polish the surface to be polished 113. According to such a principle, the projection material 111 as the core of the abrasive 110 is not particularly specified in material as far as it is softer than the material of the surface to be polished and is properly elastic to bounce when sprayed on the surface to be polished 113.

An object of polishing in the invention is a large part, and representative parts are components of a steam turbine, such as a moving vane, stationary vane, rotor, steam valve, and large-bore steam piping.

These parts are not polished by holding by hand, but are generally polished by moving a polishing machine to the parts or mounting on a large working platform for polishing.

In the invention, according to its principle, no polishing is done at all unless the abrasive reaches from the polishing machine to the surface to be polished with a certain energy.

That is, when abrasives of large and small specific gravity are sprayed at the same speed, the abrasive of large specific gravity is large in the motion energy and flies a long distance. Therefore, the surface to be polished may be set at a remote plate, and efficient polishing is realized without lowering the speed on the surface to be polished.

In the case of small specific gravity, on the other hand, the reaching distance is short and the speed on the surface to be polished is lowered due to air resistance or the like, and therefore, the surface to be polished must be set at a shorter distance in order to polish efficiency.

The present inventors attempted the following experiment in order to find the properties of an optimum projection material for the polishing method of the invention.

That is, at the initial speed of the projection material of 1,450 m/min and the projection distance (that is, the distance to the surface to be polished) of 1,200 mm, the polishing effect was investigated by using foamed urethane having the specific gravity of 0.5 and polyvinylidene chloride having the specific gravity of 1.7.

As a result, in this range of specific gravity, it is known that the polishing effect is excellent. At a larger specific gravity, polishing is excessive and the surface may be roughened. At a smaller specific gravity, on the other hand, the speed of the projection material is lowered on the surface to be polished, and satisfactory polishing is not expected.

Hence, in the invention, the specific gravity of the projection material is defined in a range of 0.5 to 1.8 g/cm$^3$.

A further experiment was attempted on the deformation amount at the time of collision against the surface to be polished (that is, the flat rate on the surface to be polished), sliding time on the surface to be polished, and elasticity showing the degree of bouncing after colliding against the surface to be polished.

A preferred elasticity of the projection material depends on the effect on the motion energy given to the projection material (speed dependence) and the effect by frictional heat generated when sliding on the surface to be polished (temperature dependence). When colliding against the surface to be polished at high speed, the polishing effect is better at lower elasticity, and when the temperature is high while sliding on the surface to be polished, the polishing effect is better at higher elasticity.

The speed dependence and temperature dependence mutually influence each other, but as a result of experiments, the inventors discovered that the speed dependence had a greater effect on the polishing performance than the temperature dependence.

At a specific projection distance, when the projection speed (initial speed) is 600 m/min, a polishing effect is noted in a relatively hard material of elasticity of about 200 kg/cm$^2$, and when the projection speed (initial speed) is raised to 3,800 m/min, a polishing effect is obtained even in a soft material of elasticity of about 10 kg/cm$^2$.

Hence, the elasticity of the projection material of the invention is defined in a range of 10 to 200 kg/cm$^2$.

As the projection material of the invention, in principle, any material having an elasticity may be used.

From the results of experiments, usable materials include petrochemical high polymer materials widely used industrially, that is, foamed polyurethane and polyvinylidene chloride used in the experiments, synthetic resin such as soft vinyl chloride, synthetic fiber, synthetic rubber, and also elastic natural materials, such as softened rice grains, luffa, sponge and gelatin.

In the polishing method of the invention, in order to grind by using abrasives, when compared by using same abrasives, to obtain a higher polishing efficiency, at the same projection speed (initial speed), efficiency polishing is possible when the projection amount of abrasives is greater, the amount of colliding abrasives per unit time and unit area is greater, and the projection speed is higher at the same amount of abrasives.

Accordingly, the inventors conducted an experiment to find the optimum value of projection speed (initial speed).

Figure 3:
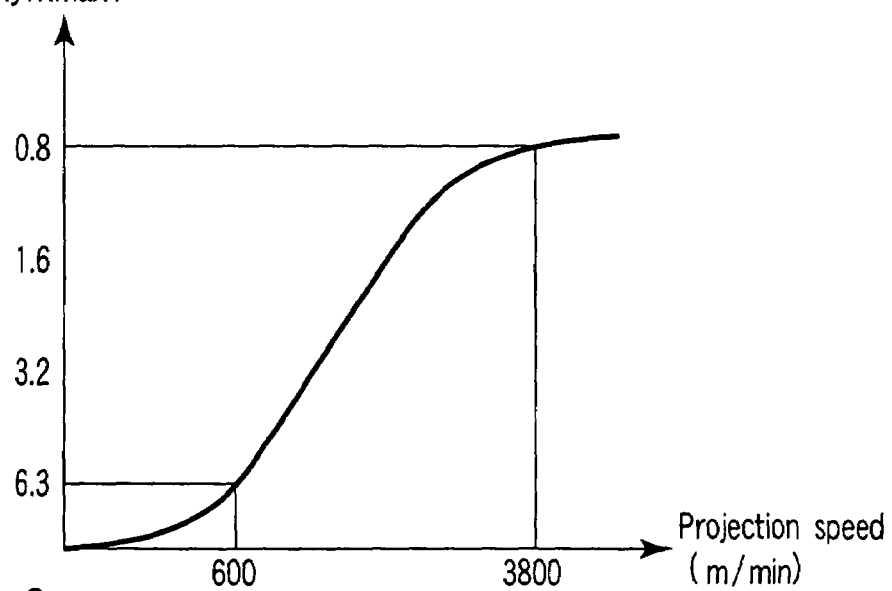
FIG. 3 is a graph showing the correlation of a projection material speed and polishing efficiency for explaining the first embodiment of the method of polishing the large part according to the invention.

FIG. 3 shows results of experiment about the optimum projection speed (initial speed) of the polishing method of the invention.

In the diagram, the axis of ordinates represents the surface roughness of the surface after polishing, and the axis of abscissas denotes the projection speed (initial speed) of the projection material. On the axis of ordinates, Ry=6.3 shows the surface roughness allowable value at the time of design of the current steam turbine parts, and there is no problem in performance is not larger than this value.

As known from the diagram, the surface roughness is not improved if the projection speed (initial speed) is less than 600 m/sec. This speed coincides with the lower limit peripheral speed of internal circumference grinding by using a vitrified grindstone in a conventional grinding work, and a notable grinding effect is not obtained even in the polishing method of the invention.

On the other hand, at the projection speed (initial speed) of 3,800 m/sec or more, the improving effect of surface roughness reaches the limit. This speed is approximately the upper limit of peripheral speed in an elastic grindstone for use in conventional screw grinding or groove grinding. However, in the polishing method of the invention, at this speed, considering the damage of the projection material on the surface to be polished or the structure of a projection apparatus, the upper limit is considered to be nearly 3,000 m/sec.

Hence, in the invention, the projection speed (initial speed) of the projection material is limited in a range of 600 to 3,800 m/sec.

The volume of projection varies significantly depending on the shape of the object of polishing, projection distance, and density of abrasives.

In polishing of a small area in narrow and complicated parts, the projection amount is decreased and the projection speed is lowered, and polishing is performed at about 5 cc/cm$^2$·sec.

When polishing a relatively wide area, it is very efficient if a projection amount of about 300 cc/cm$^2$·sec is available.

Basically, in the case where the object of polishing is a small part, when polishing a narrow area, the projection speed is increased and the projection amount is decreased, and, when deformation by polishing is anticipated, the projection speed is lowered and the projection amount is increased.

When the projection distance is large, the polishing effect is greater by using abrasives having the large specific gravity.

Hence, although variable with the specific gravity of abrasives, it is defined in a range of 5 to 300 cc/cm$^2$·sec per unit area in the present embodiment.

Thus, by using abrasives composed of abrasive grains and projection material such as elastic petrochemical high polymer material (synthetic fiber, synthetic resin, and synthetic rubber) having the specific gravity of 0.5 to 1.8 g/cm$^3$ and elasticity of 10 to 200 kg/cm$^2$, or an elastic natural material (natural rubber, vegetable fiber, and vegetable seeds), and projecting and colliding the abrasives at a speed of 600 m to 3800 m per minute and volume of 5 to 300 cc/cm$^2$·sec per unit area, the surface roughness of the object of polishing can be improved.

As a second embodiment of the invention, creation of abrasives for use in the polishing method of the invention will be explained below.

The properties of the projection material 111 as the core of the abrasive 110 shown in FIG. 1 are as explained above, and usable materials include petrochemical high polymer materials, that is, foamed polyurethane and polyvinylidene chloride used in the experiments, other synthetic resin, synthetic fiber, and synthetic rubber, and also elastic natural materials, such as softened rice grains, luffa, sponge and gelatin.

Abrasive grains as polishing materials are adhered (applied) to the surrounding of the projection material 111, and the abrasives are obtained. As the method of adhering, the invention provides four methods as explained below.

A first abrasive makes use of the adhesiveness of the material of the projection material 111. In the case where the projection material 111 is made of soft vinyl chloride or the like having a plasticizer such as ester phthalate added thereto, since the material itself is adhesive and tacky, and abrasive grains can be adhered (applied) to the surrounding of the projection material 111 by making use of this property.

A second abrasive uses the projection material 111 of high polymer material having no adhesiveness and tackiness, and this is a method applied generally to materials called plastics. In this case, abrasive grains are adhered to the surrounding of the projection material 111 by using an elastic adhesive.

Representative examples of such an elastic adhesive include a vinyl acetate resin emulsion adhesive used as a kind of woodcraft bond. After curing, it shows a translucent appearance and has a sufficient elasticity.

Other applicable materials are urethane, emulsion and synthetic rubber adhesives, and adhesives containing silicone polymer.

Binders of grindstones widely used industrially are also usable, rubber bond known as elastic bond, resinoid bond, shellac bond, and polyvinyl alcohol bond.

A third abrasive is prepared by anchoring grains physically in the projection material 111, or adhering (applying) electrostatically.

A fourth abrasive has the projection material 111 made of synthetic rubber, natural rubber, synthetic fiber, vegetable fiber or similar material.

In the first to third abrasives, abrasive grains are adhered only to the periphery of the projection material 111, but in the fourth abrasive, abrasive grains can be dispersed easily into the inside of the projection material 111 when fabricating the abrasive.

It is a common feature of the first abrasive to fourth abrasive in the polishing method of the invention that the polishing effect is realized by the abrasive grains dispersed on the periphery or inside, not by the projection material 111.

It is also a feature of the polishing method of the invention that polishing is done inn dry state, using the abrasive only, without using coolant as in the prior art. Since coolant is not used, it is possible to adhere (apply) the abrasive grains to the projecting material by using an adhesive having low resistant to moisture, as in the second abrasive.

The grain size of the abrasive created in these methods can be properly selected depending on the state of the surface to be polished.

In the polishing method of the invention, as explained above, since the abrasive is projected to the surface to be polished, at the abrasive grain size of 0.1 mm or less, it may be appropriate for polishing of a small area, but it is hard to project at high speed in relation to the air resistance or the like at the time of projection.

On the other hand, at the abrasive grain size of 10 mm or more, damage to the surface to be polished increases, and the projection machine is increased in size, and the working efficiency is lowered extremely.

Hence, in the invention, the abrasive grain size of the abrasive is defined in a range of 0.1 to 10.0 mm.

As the abrasive shape, a spherical shape is ideal for principle of polishing, but any granular shape is substantially applied industrially.

As the abrasive grain material to be applied to the periphery of the projection material as the core, oxide ceramics, carbide ceramics, diamond, and the like of high hardness can be basically used, and herein SiC, $SiO_2$, $Al_2O_3$, and $ZrO_2$ are selected because they are widely used industrially.

In the first to fourth abrasives, abrasive grains on the projection material surface responsible for polishing effect gradually drop out from the projection material surface by repeated projection and collision in the polishing process. Decline of polishing effect by dropping of abrasive grains can be sufficiently regenerated by adhering the abrasive grains again to the projection material surface.

The abrasive grain size of the abrasive, shape range and chemical composition may be defined as follows.

In the first to fourth abrasives, the size and shape may be a granular shape ranging from 0.2 mm to 5.0 mm for polishing small area, and the chemical composition should be composed of components of the projection material and abrasive grains other than chlorine, sulfuric acid, silica, boron, iron, copper, nickel, chromium and cobalt which are strictly controlled in the nuclear power generation equipment.

By such size, shape and chemical composition, the abrasive can be also applied in the nuclear power generation equipment.

In the method of polishing a large part in the first or second embodiment described above, depending on the surface state, surface hardness and surface roughness of the large part to be polished, the abrasive grains in the first to fourth abrasives may be changed, and the surface roughness may be improved in gradual steps.

In the case of mirror polishing by a conventional technique, also in the embodiment intended to improve the surface roughness by polishing roughly by using rough grains and gradually reducing the abrasive grain size, the surface roughness level after polishing can be controlled by selection of the abrasives. For this purpose, it is required to change the abrasive grains adhered to the projection material, or prepare multiple types of abrasives of different abrasive grains to be applied.

A third embodiment of the invention will be explained.

In this embodiment, in the method of polishing a large part using the abrasives 110 explained in the first and second embodiments, by projecting the abrasives 110 at an angle of 30° to 80° to the normal direction of the surface to be polished, it is intended to improve the surface roughness of the surface to be polished.

In the polishing method of the invention, as described above, by projecting the abrasives to the surface to be polished, it makes use of sliding of the abrasive on the surface to be polished for a very short time upon collision, and hence the angle formed by the surface to be polished and the projected abrasive is a great influence on the polishing effect.

Figure 4:
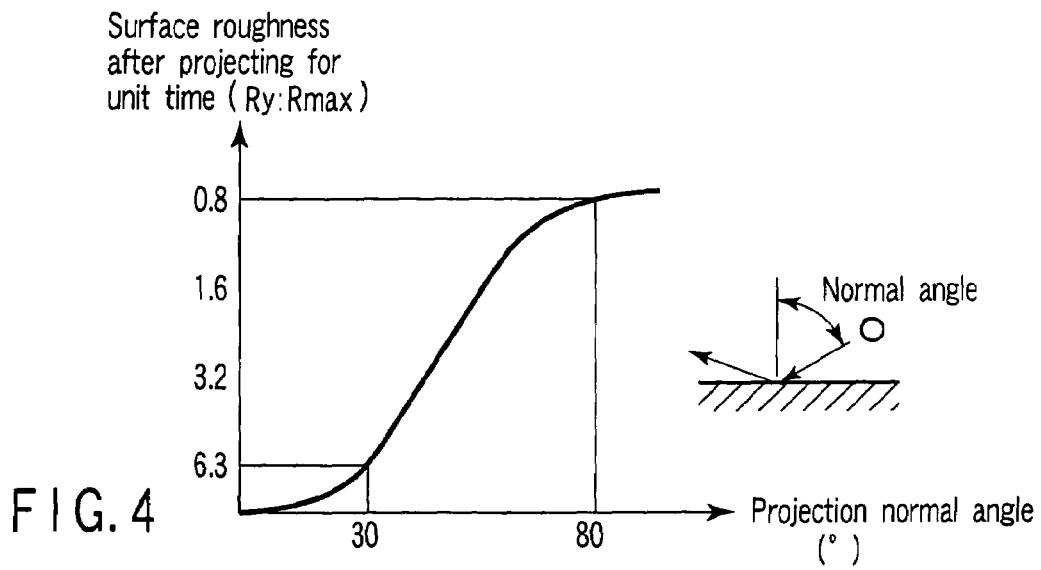
FIG. 4 is a graph showing the correlation of a projection angle and polishing efficiency for explaining a third embodiment of a method of polishing the large part according to the invention.
Figure 5:
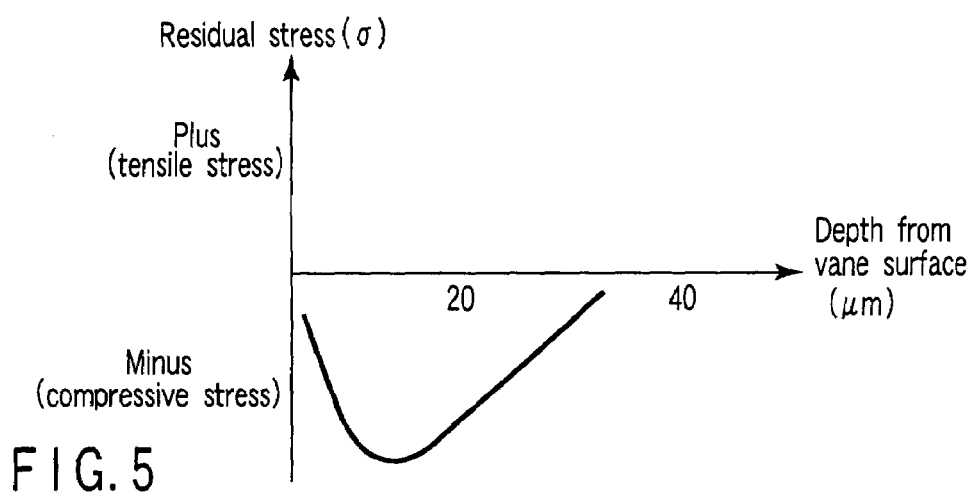
FIG. 5 is a graph showing residual stress distribution in the depth direction from a vane surface by collision of abrasives in a polishing process in the first to third embodiments of the method of polishing the large part according to the invention.
Figure 8:
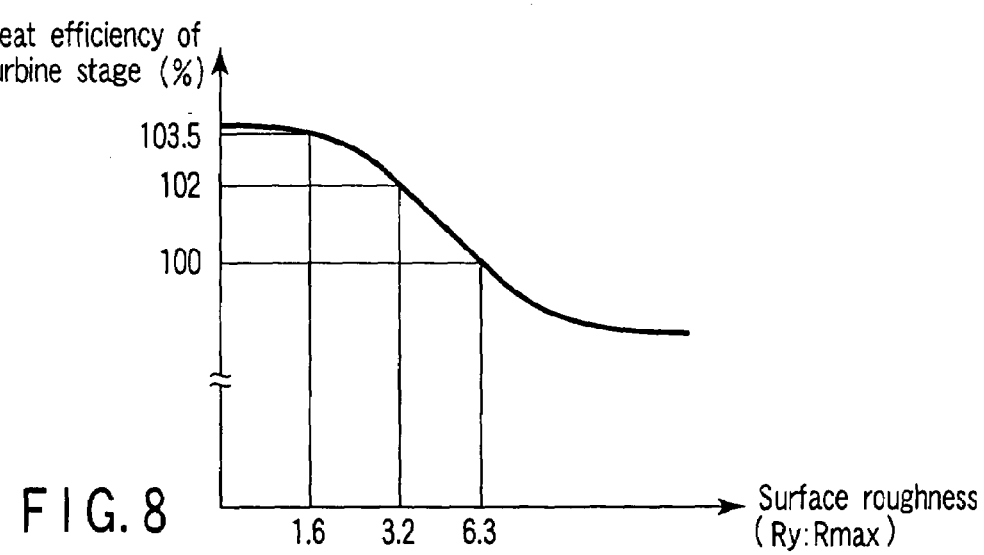
FIG. 8 is a graph showing the correlation of heat efficiency and surface roughness of a steam passage in a steam turbine.
Figure 6:
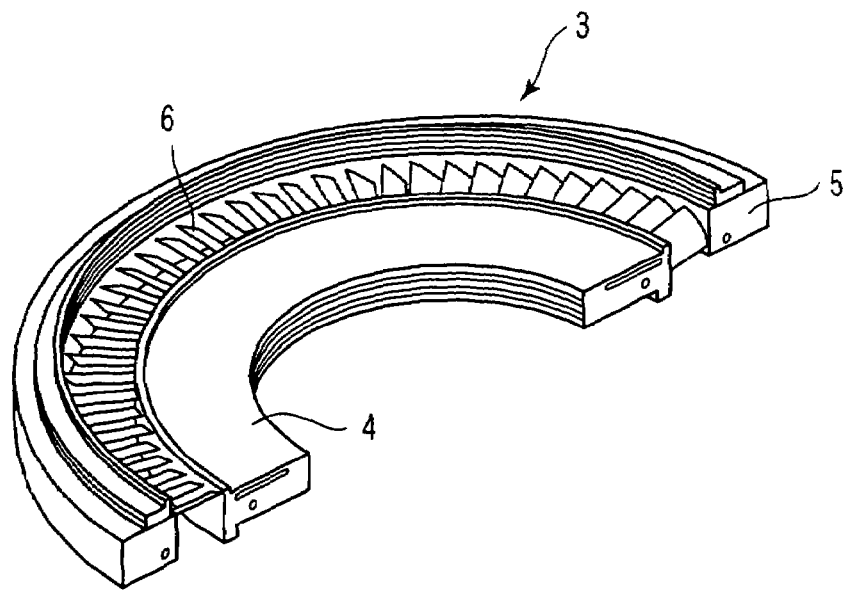
FIG. 6 is a perspective view showing half (180°) of nozzle diaphragm of a steam turbine.
Figure 7:
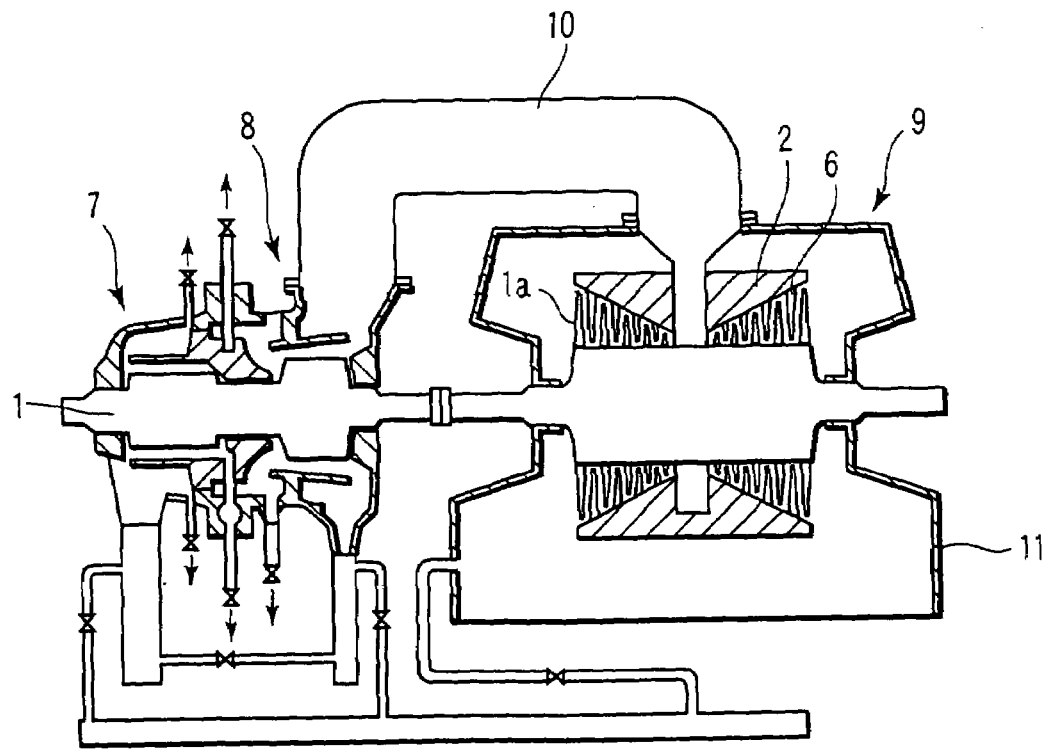
FIG. 7 is a sectional view schematically showing an entire steam turbine equipment.

FIG. 4 shows the relation of the abrasive projection angle (normal angle of surface to be polished) and surface roughness after unit time projection.

As known from the diagram, when the normal angle is large, the improvement effect of the surface roughness is greater when the abrasive is projected to the surface to be polished at an angle closer to the normal direction.

This because the surface sliding time is longer when the abrasive is closer to the tangential line to the surface to be polished. If the angle is too large, to the contrary, the energy applied to the abrasive at the time of projection works only in the sliding direction, and hardly acts in the direction of the surface to be polished, so that polishing effect is not obtained.

On the other hand, when the normal angle is small, that is, when the abrasive is projected to the surface to be polished at an angle closer to the perpendicular direction, the abrasive sliding time is shorter, and the energy given to the abrasive at the time of project works too much in the plane direction of the surface to be polished and hardly acts in the sliding direction. Therefore, the abrasive hardly slides on the surface to be polished, and as a result, a polishing effect by the abrasive grains adhered (applied) to the outer periphery of the abrasive is not obtained.

In the experiments by the inventors, a sufficient polishing effect is confirmed at normal direction angle of 45° to 80°. However, considering the actual polishing work of the large part having a three-dimensional shape, the projection direction of the abrasive is not always possible at such an effective angle.

In the polishing method of the invention, therefore, although the polishing effect is somewhat impaired, the normal direction angle of 30° to 80° capable of improving the current surface roughness is determined as the range of the projection angle of the abrasive.

According to the polishing method in the first to third embodiments, effects of polishing are described below by referring to representative large parts such as a gas turbine and steam turbine parts, in particular, parts used in operation for a long time and worsened in the surface roughness, such as turbine moving vanes and stationary vanes, turbine rotors, and parts in the fluid passage of steam and combustion gas (steam valve, steam piping, crossover tube, turbine inlet, outlet, and nozzle box inside).

In polishing of turbine parts, the purpose is to remove scales and oxides formed and grown on the object surface, and to recover and enhance the surface roughness.

As mentioned above, most of moving and stationary vanes, rotors, and parts in the combustion gas or steam passages are exposed to steam or gas of high temperature and high pressure during operation, and oxide films are formed on the surface, and also rust and dirt flying from the combustor and boiler side deposit like scales.

They are disturbance elements in nondestructive inspection at the time of checking, and conventionally they have been removed by an air blasting method using a ceramic projection material. In the conventional technique, harmful factors can be removed, but the surface roughness is often worsened at the same time.

In application of the air blasting method using the ceramic projection material in rotary parts, since the grinding amount of the object is significant, the weight balance of the rotating element may be broken, and actually imbalance of a steam turbine moving vane by cleaning operation has been experienced.

In the polishing method of the first to third embodiments, while removing harmful factors including hard oxides and scales, the surface roughness can be recovered and improved without disturbing the balance of the rotating element, and the polishing effect is obtained in addition to the sound cleaning effect.

Also in the polishing method of the first to third embodiments, without dismounting the existing steam turbine moving vane from the turbine rotor, the surface roughness can be recovered and improved in the assembled state.

The moving vane of the steam turbine is directly coupled with the generator, and plays an extremely important role in rotation of the turbine rotor, and regardless of the difference of type, that is, whether in reaction turbine or in impulse turbine, the surface roughness of the moving vane has a large effect on the turbine performance. In particular, the surface roughness of the steam flowing passage of high temperature and high pressure has a substantial effect on the turbine performance, but the moving vane positioned in the steam passage of high temperature and high pressure (so-called high pressure turbine) is short in the portion exposed to steam called effective part, and the restraint plate at the outer circumferential side called shroud is large. Hence, there are many narrow and complicated parts, and polishing work is extremely difficult.

According to the polishing method of the first to third embodiments, since the abrasive collides against the object of polishing at a predetermined angle to polish, the narrow and complicated parts of the turbine vane can be polished while the moving vane is being assembled in the turbine rotor.

Further, in the polishing method of the invention, while the stationary vane of the steam turbine is in a state of annular nozzle diaphragm or in half ring state (being split at position of 180°), the deformation amount at the rear edge after polishing is 2 mm or less. Accordingly, the rear edge being thinned out due to aging effects such as oxide scale deposits and corrosion as compared with the time of installation can be sufficiently polished, and the surface roughness can be recovered and enhanced without disturbing the shape.

Similarly, by polishing by colliding the abrasive to the object of polishing at a predetermined angle, narrow and complicated parts difficult to work can be polished.

It is hence possible to polish narrow and complicated parts which are difficult to work by the conventional technique, such as a vane surface of steam turbine stationary vanes, walls of a steam passage, and fitting parts of nozzle diaphragm and walls, without disassembling.

On the other hand, by the polishing method in the first to third embodiments, it is also possible to recover and improve the corrosion resistance of turbine moving and stationary vanes, turbine rotors and other turbine parts having corrosion resistant and wear resistant coating, and the surface roughness of the wear resistant coating surface.

Corrosion resistant coating is applied for the purpose of prevention of corrosion of a base material in an electrical or chemical corrosive environment, and it is particularly applied widely in steam turbine members used in geothermal power generation.

Wear resistant coating is applied in various materials as measures against mechanical wall thickness reduction by solid particle erosion such as boiler scales, sliding, impact, vibration, or the like.

Such coating applied in complicated parts such as turbine parts among large parts is likely to cause dropping or peeling of a film, and usually in order to damage on the film layer, treatment for surface roughness is not given to the film after installation.

However, in the polishing method of the first to third embodiments, since the wall thickness reduction by wear is extremely small, and physical and mechanical effects on the surface to be polished are small, the surface roughness can be improved even in turbine parts of a complicated shape after coating treatment.

According to the polishing method of the first to third embodiments, moreover, a compressive stress can be applied to the outermost surface layer of the object of polishing by the collision effect of abrasives.

For example, in new parts of vanes, hitherto, the entire effective parts of vanes have been polished by rotary tools mainly for the purpose of final adjustment of shape and polishing of the surface after mechanical processing for row materials.

In such a conventional manufacturing method, a tensile residual stress is left over on the outermost surface layer of effective parts of new moving vanes. During operation, in particular, the moving vanes are always loaded with tensile stress by centrifugal force by turbine rotor rotation. If this tensile residual stress is left over after stopping, allowance for stress during rotation is eliminated, and it is not preferred from the viewpoint of designing.

In the polishing method of the first to third embodiments, in the polishing process, although the level of residual stress is small owing to the collision effect of the abrasive, a compressive residual stress similar to the conventional peening effect can be given to the surface layer of the vane.

Moreover, in the polishing method of the first to third embodiments, the hard oxide film formed and grown on the surface to be polished can be removed, and the surface roughness is improved, so that the quality of nondestructive inspection can be enhanced.

That is, the steam turbine provided for operation is periodically inspected by various nondestructive inspections depending on the purpose at every predetermined period. In particular, advanced inspection technology and precision are demanded in parts to be used in the condition of high temperature and high pressure.

At the present, however, it is hard to remove hard oxide films formed and grown during operation, and there has been a limit in precision of inspection.

In the polishing method of the first to third embodiments, since the surface roughness can be improved while removing oxide films from the surface, so that the quality of nondestructive inspection can be enhanced.

A fourth embodiment of the invention will be described below.

In the fourth embodiment, when polishing turbine moving vanes as representative large parts especially in the polishing method of the first to third embodiments, it is intended to project and collide the abrasives from a substantially orthogonal direction to the rear edge line.

According to the fourth embodiment, by polishing in a substantially orthogonal direction to the rear edge line of the steam turbine moving and stationary vanes, that is, parallel to the steam flow direction, small flaws by polishing (polishing marks) are parallel to the steam flow direction, and the effects of the surface roughness on the fluid (steam) can be minimized.

Therefore, at the same surface roughness, as compared with the case of not polishing in a direction substantially orthogonal to the rear edge line, it is effective to prevent the resistance to the fluid from increasing.

This is to explain an embodiment of polishing the steam turbine moving vanes by the method of polishing large parts according to the invention.

The steam turbine moving vane is cut out into a vane shape from a rolled or forged material of 12Cr steel, and polished on the surface at a final stage, and assembled into a turbine rotor. At this time, the surface is finished to a state of about Ry 6.3 or Ry 1.0.

In a conventional polishing technology, the directivity of the surface roughness by polishing is kept constant by manual polishing of the effective parts of the vane having three-dimensional curves along the flow direction of the steam. Herein, the directivity is polishing to define the surface roughness maximum direction orthogonal to the flow direction of steam, when the surface roughness is measured in two orthogonal directions. That is, it is designed to polish such that polishing flaws (polishing marks) are present parallel to the steam flow direction.

According to the method of polishing the large part according to the invention, polishing flaws (polishing marks) not avoidable by the conventional polishing technique can be eliminated, and the reduction in wall thickness of the surface to be polished by polishing is extremely small, so that accurate and precise surface polishing is realized.

Elimination of polishing flaws (polishing marks) means elimination of directivity by polishing, and the dependence on polishing work by manual work requiring advanced technology can be substantially decreased.

Since the reduction in wall thickness of the surface to be polished by polishing is extremely small, curing of the parts not to be polished can be simplified. Further, accurate and precise surface polishing brings about an outstanding effect on surface treatment before precision inspection.

In the foregoing embodiments, principal parts of a steam turbine and gas turbine, such as turbine moving vanes and stationary vanes are mainly polished, but applicable parts of the polishing method of the invention are not limited thereto as far as the parts are medium to large in size. Examples of such parts include the axle rotary parts of rotary drive devices, piston outer surface of hydraulic equipment, and rail contact surfaces of railway wheels.

The invention makes it possible to polish the surface of the large part which is hitherto difficult to polish, including the narrow or fitting part, and also makes it possible to remove the oxide films grown on the surface without impairing the polished surface, thereby enhancing the quality of nondestructive inspection.

What is claimed is:

1. A method of polishing a large part, wherein a granular abrasive of 0.1 mm or more and 10.0 mm or less comprising abrasive grains serving as abrasive materials adhered to the surrounding of a projection material or dispersed in the projection material is sprayed on a surface to be polished at a speed of 600 m or more and 3,800 m or less per minute by a unit area volume of 5 to 300 cm$^3$/cm$^2$·sec, the abrasive comes into collision with the surface to be polished and slide, and the abrasive grains adhered to or dispersed in the abrasive polish the surface to be polished.

2. The method of polishing the large part according to claim 1, wherein the projection material is a petrochemical high polymer material formed of such as a synthetic fiber, synthetic resin, or synthetic rubber, or a natural material formed of such as a natural rubber, vegetable fiber, or vegetable seeds having specific gravity of 0.5 to 1.8×10$^{-3}$ kg/cm$^3$, and elasticity of 10 to 200 kg/cm$^2$.

3. The method of polishing the large part according to claim 2, wherein the abrasive is sprayed from a direction of 30° to 80° to the normal direction of the surface to be polished.

4. The method of polishing the large part according to claim 2, wherein the projection material and abrasive grains are composed of components other than chlorine, sulfuric acid, silica, boron, iron, copper, nickel, chromium and cobalt.

5. The method of polishing the large part according to claim 1, wherein the abrasive is sprayed from a direction of 30° to 80° to the normal direction of the surface to be polished.

6. The method of polishing the large part according to claim 1, wherein the abrasive grains are anyone of SiC, SiO$_2$, Al$_2$O$_3$, and ZrO$_2$.

7. The method of polishing the large part according to claim 1, wherein the projection material and abrasive grains are composed of components other than chlorine, sulfuric acid, silica, boron, iron, copper, nickel, chromium and cobalt.

* * * * *